(12) United States Patent
Hayashi et al.

(10) Patent No.: US 9,821,645 B2
(45) Date of Patent: Nov. 21, 2017

(54) MOTOR VEHICLE

(71) Applicant: TOYOTA JIDOSHA KABUSHIKI KAISHA, Toyota-shi, Aichi-ken (JP)

(72) Inventors: Tsuyoshi Hayashi, Miyoshi (JP); Atsushi Yamanaka, Okazaki (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/112,045

(22) PCT Filed: Dec. 23, 2014

(86) PCT No.: PCT/IB2014/002867
§ 371 (c)(1),
(2) Date: Jul. 15, 2016

(87) PCT Pub. No.: WO2015/110861
PCT Pub. Date: Jul. 30, 2015

(65) Prior Publication Data
US 2016/0339774 A1 Nov. 24, 2016

(30) Foreign Application Priority Data

Jan. 22, 2014 (JP) .................................. 2014-009568

(51) Int. Cl.
*B60R 16/04* (2006.01)
*B60K 1/04* (2006.01)
(Continued)

(52) U.S. Cl.
CPC .................. *B60K 1/04* (2013.01); *B60K 1/00* (2013.01); *B62D 25/20* (2013.01); *B60K 2001/005* (2013.01); *B60K 2001/0438* (2013.01)

(58) Field of Classification Search
CPC . B62D 25/20; B60K 1/04; B60K 1/00; B60K 2001/0438; B60K 2001/003; B60K 2001/005
See application file for complete search history.

(56) References Cited

U.S. PATENT DOCUMENTS 5,390,754 A * 2/1995 Masuyama .............. B60K 1/04
105/51
6,188,574 B1 * 2/2001 Anazawa ................. B60K 1/04
180/68.5
(Continued)

FOREIGN PATENT DOCUMENTS

JP       2004265839 A     9/2004
JP       2006-306249 A    11/2006
(Continued)

*Primary Examiner* — James M Dolak
(74) *Attorney, Agent, or Firm* — Sughrue Mion, PLLC

(57) ABSTRACT

A motor vehicle includes a floor panel, a battery pack, a battery pack-associated component, a first tray, a first flange portion, a second tray, and a second flange portion. The battery pack is arranged on the first tray. The first tray is arranged on the floor panel of the motor vehicle. The first flange portion is provided on a first peripheral edge. The first peripheral edge is a peripheral edge of the first tray. The battery pack-associated component is arranged on the second tray. The second tray is arranged on the floor panel of the motor vehicle. The second flange portion is provided on a second peripheral edge. The second peripheral edge is a peripheral edge of the second tray. The second flange portion is located above the first flange portion in a vertical direction of the motor vehicle. The second flange portion overlaps with the first flange portion in the vertical direction of the motor vehicle. The first flange portion projects toward the second tray side. The second flange portion projects toward the first tray side.

6 Claims, 5 Drawing Sheets

(51) Int. Cl.
   *B60K 1/00*  (2006.01)
   *B62D 25/20* (2006.01)

(56) References Cited

U.S. PATENT DOCUMENTS

| | | | | |
|---|---|---|---|---|
| 6,227,322 B1 * | 5/2001 | Nishikawa | ............... | B60R 16/04 180/65.1 |
| 7,401,669 B2 * | 7/2008 | Fujii | ............... | B60R 16/04 180/65.1 |
| 7,654,351 B2 * | 2/2010 | Koike | ............... | B60K 1/04 180/68.1 |
| 7,654,352 B2 * | 2/2010 | Takasaki | ............... | B60K 1/04 180/65.1 |
| 7,771,865 B2 * | 8/2010 | Takasaki | ............... | B60K 1/04 429/71 |
| 8,776,927 B2 * | 7/2014 | Akazawa | ............... | H01M 2/1077 180/65.1 |
| 8,936,125 B2 * | 1/2015 | Nakamori | ............... | B60K 1/04 180/68.5 |
| 8,960,350 B2 * | 2/2015 | Kosaki | ............... | B60K 1/04 180/65.22 |
| 9,027,684 B2 * | 5/2015 | Araki | ............... | B60K 1/04 180/311 |
| 9,054,398 B2 * | 6/2015 | Ohkuma | ............... | B60K 1/04 |
| 9,096,117 B2 * | 8/2015 | Matsuda | ............... | B60K 6/40 |
| 9,172,071 B2 * | 10/2015 | Yoshioka | ............... | B60K 1/04 |
| 9,321,338 B2 * | 4/2016 | Naruke | ............... | B60K 1/04 |
| 9,490,460 B2 * | 11/2016 | Yanagi | ............... | H01M 2/1083 |
| 9,616,939 B2 * | 4/2017 | Natsume | ............... | B62D 25/2036 |
| 9,623,742 B2 * | 4/2017 | Ikeda | ............... | B60K 1/04 |
| 9,627,721 B2 * | 4/2017 | Kosaki | ............... | H02J 7/0068 |
| 9,630,483 B2 * | 4/2017 | Yamada | ............... | B60K 1/04 |
| 9,673,433 B1 * | 6/2017 | Pullalarevu | ............... | H01M 2/1083 |
| 9,688,314 B2 * | 6/2017 | Ajisaka | ............... | B62D 25/20 |
| 9,694,772 B2 * | 7/2017 | Ikeda | ............... | B60K 1/04 |
| 9,718,340 B2 * | 8/2017 | Berger | ............... | B60K 1/00 |
| 9,718,362 B2 * | 8/2017 | Yamanaka | ............... | B60L 3/0007 |
| 9,722,223 B1 * | 8/2017 | Maguire | ............... | H01M 2/1083 |
| 2006/0016633 A1 | 1/2006 | Fujii et al. | | |

FOREIGN PATENT DOCUMENTS

| | | |
|---|---|---|
| JP | 2006306238 A | 11/2006 |
| JP | 2013-107565 A | 6/2013 |

* cited by examiner

MOTOR VEHICLE

BACKGROUND OF THE INVENTION

1. Field of the Invention

The invention relates to a motor vehicle.

2. Description of Related Art

In Japanese Patent Application Publication No. 2013-107565 (JP-2013-107565 A), a motor vehicle is mounted with a battery pack on a floor panel.

SUMMARY OF THE INVENTION

In Japanese Patent Application Publication No. 2013-107565 (JP-2013-107565 A), when a liquid such as water or the like enters a space above the floor panel on which the battery pack is mounted, from a floor side of the motor vehicle or a vehicle interior side to be poured on the battery pack, a functional fault may be caused.

The invention provides a motor vehicle that prevents a functional failure from being caused through the pouring of water on a battery pack that is mounted on a floor panel.

A motor vehicle according to the invention adopts the following means in order to achieve the aforementioned object.

According to an aspect of the invention, a motor vehicle includes a floor panel, a battery pack, a battery pack-associated component, a first tray, a first flange portion, a second tray, and a second flange portion. The battery pack is arranged on the first tray. The first tray is arranged on the floor panel of the motor vehicle. The first flange portion is provided on a first peripheral edge. The first peripheral edge is a peripheral edge of the first tray. The battery pack-associated component is arranged on the second tray. The second tray is arranged on the floor panel of the motor vehicle. The second flange portion is provided on a second peripheral edge. The second peripheral edge is a peripheral edge of the second tray. The second flange portion is located above the first flange portion in a vertical direction of the motor vehicle. The second flange portion overlaps with the first flange portion in the vertical direction of the motor vehicle. The first flange portion projects toward the second tray side. The second flange portion projects toward the first tray side.

In the foregoing aspect of the invention, the floor panel may include a floor tunnel portion. The first flange portion and the second flange portion may overlap with each other on the floor tunnel portion.

In the foregoing aspect of the invention, the floor panel may include a first recessed portion and a second recessed portion in a lateral direction of the motor vehicle. The first recessed portion and the second recessed portion are regions that are sunken downward in the vertical direction of the motor vehicle with respect to other regions of the floor panel. The floor tunnel portion may be located between the first recessed portion and the second recessed portion. The floor tunnel portion may be a region that protrudes upward in the vertical direction of the motor vehicle with respect to the first recessed portion and the second recessed portion.

In the foregoing aspect of the invention, the first tray may be arranged on the first recessed portion. The second tray may be arranged on the second recessed portion. The first flange portion and the second flange portion may overlap with each other above the floor tunnel portion.

In the foregoing aspect of the invention, a protrusion portion may be provided on the first peripheral edge. The protrusion portion may protrude above the second flange portion, and face the second flange portion.

In the foregoing aspect of the invention, the first flange portion, the second flange portion, and the floor tunnel portion may be arranged spaced apart from one another in the vertical direction of the motor vehicle.

In the foregoing aspect of the invention, a connector may be connected to the battery pack-associated component. The connector may be a non-waterproof connector.

In the foregoing aspect of the invention, the battery pack-associated component may be a battery pack cooling device. The battery pack cooling device may include a cooling blower and a duct. The battery pack cooling device may be configured to cool the battery pack by supplying cooling wind to the battery pack.

According to the invention, there is provided a structure in which the battery pack is accommodated in the first tray and no liquid flows into the first tray even when a liquid such as water or the like has entered a space above the floor panel on which the battery pack is mounted. Therefore, a functional failure can be prevented from being caused due to the pouring of water on the battery pack.

BRIEF DESCRIPTION OF THE DRAWINGS

Features, advantages, and technical and industrial significance of one exemplary embodiment of the invention will be described below with reference to the accompanying drawings, in which like numerals denote like elements, and wherein.

DETAILED DESCRIPTION OF EMBODIMENT

A mode for carrying out the invention (hereinafter referred to as the embodiment of the invention) will be described hereinafter with reference to the drawings.

Figure 1:
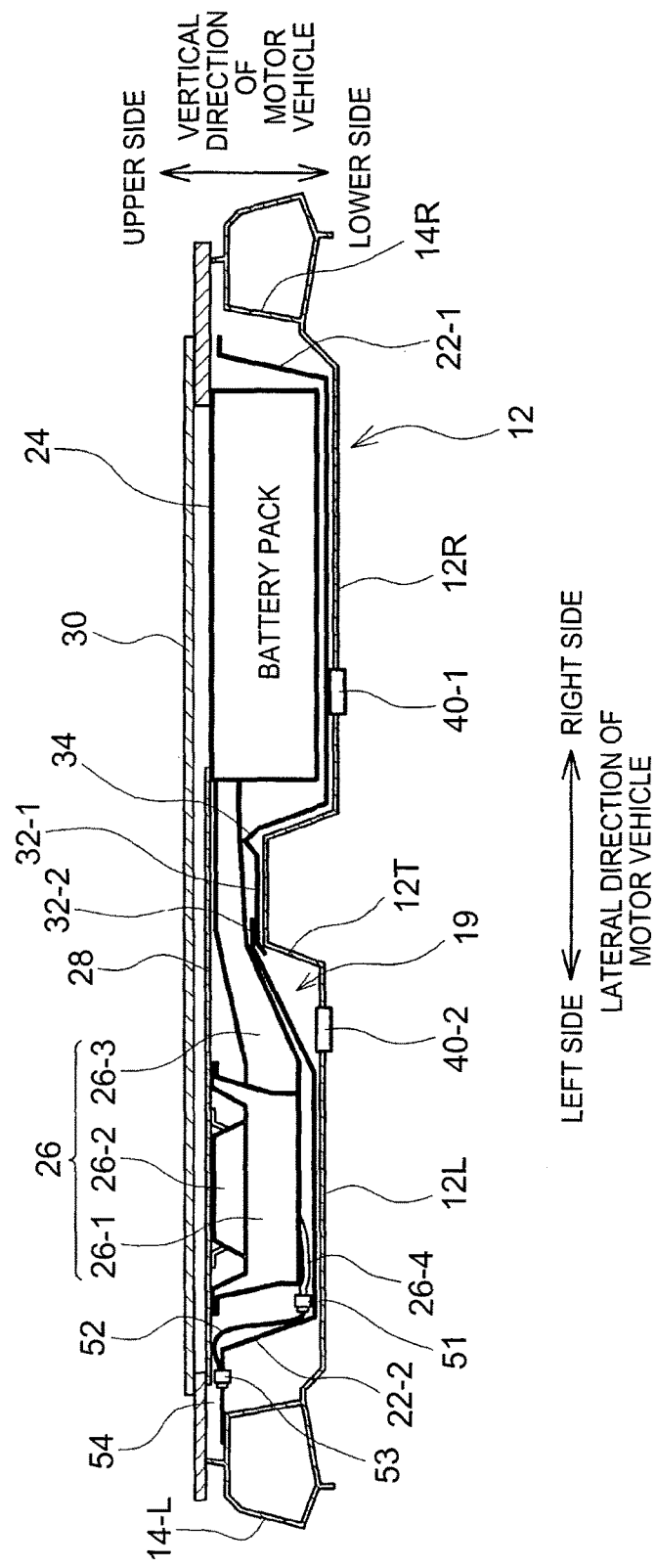
FIG. 1 is a view showing a configurational example of a motor vehicle according to the embodiment of the invention, as viewed from behind the motor vehicle.
Figure 2:
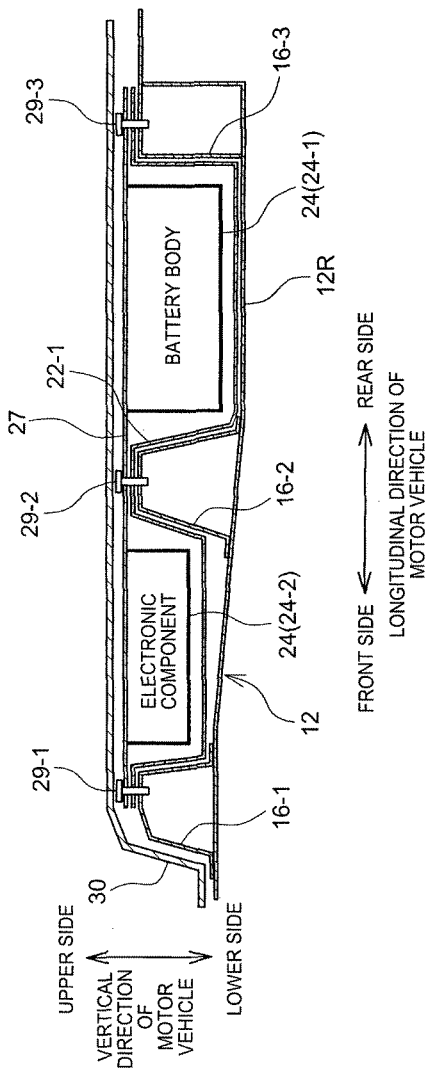
FIG. 2 is a view showing a configurational example of the motor vehicle according to the embodiment of the invention, as viewed from a left side of the motor vehicle.
Figure 3:
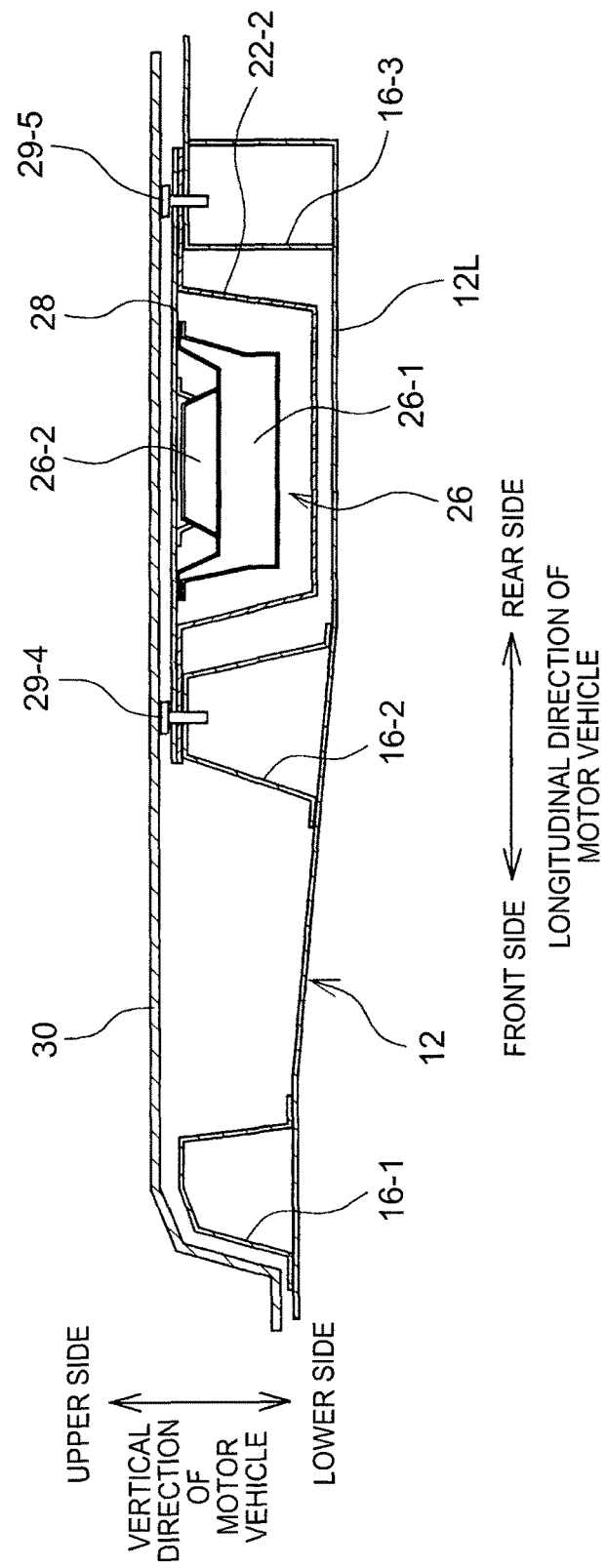
FIG. 3 is a view showing a configurational example of the motor vehicle according to the embodiment of the invention, as viewed from the left side of the motor vehicle.

FIGS. 1 to 3 are views showing an overall configuration of a motor vehicle according to the embodiment of the invention. FIG. 1 shows a configurational example of a floor as viewed from behind the motor vehicle. FIG. 2 shows a configurational example of a right floor as viewed from the left side of the motor vehicle. FIG. 3 shows a configurational example of a left floor as viewed from the left side of the motor vehicle. Both end portions of a floor panel 12 in a lateral direction of the motor vehicle are joined to a left rocker panel 14L and a right rocker panel 14R, which extend in a longitudinal direction of the motor vehicle, through welding, respectively. An upper face of the floor panel 12 faces a vehicle interior. Cross members 16-1 to 16-3 that extend in the lateral direction of the motor vehicle are joined to the floor panel 12 through welding. The cross members 16-1 to 16-3 are arranged spaced apart from one another in the longitudinal direction of the motor vehicle. The cross member 16-2 is located in front of the cross member 16-3 with respect to the motor vehicle. The cross member 16-1 is located in front of the cross member 16-2 with respect to the motor vehicle. A floor tunnel portion 12T is formed at a central portion of the floor panel 12 in the lateral direction of the motor vehicle. The floor tunnel portion 12T protrudes upward with respect to the motor vehicle, and is formed in such a manner as to extend in the longitudinal direction of the motor vehicle. Furthermore, floor recessed portions 12L and 12R that are sunken downward with respect to the motor vehicle are formed, as part of the floor panel 12. The floor recessed portion 12L is formed at a position between the floor tunnel portion 12T and the left rocker panel 14L in the lateral direction of the motor vehicle. The floor recessed portion 12R is formed at a position between the floor tunnel portion 12T and the right rocker panel 14R in the lateral direction of the motor vehicle.

Waterproof trays 22-1 and 22-2 are installed on the upper face of the floor panel 12. As a material of the waterproof trays 22-1 and 22-2, it is possible to use, for example, resin. In the example of FIGS. 1 to 3, the waterproof tray 22-1 is laid on the floor recessed portion 12R, and the waterproof tray 22-2 is laid on the floor recessed portion 12L. That is, the waterproof trays 22-1 and 22-2 are arranged across the floor tunnel portion 12T in the lateral direction of the motor vehicle. The waterproof tray 22-1 is arranged at a position between the cross member 16-1 and the cross member 16-3 in the longitudinal direction of the motor vehicle. The waterproof tray 22-1 is arranged at a position between the cross member 16-2 and the cross member 16-3 in the longitudinal direction of the motor vehicle.

Figure 4:
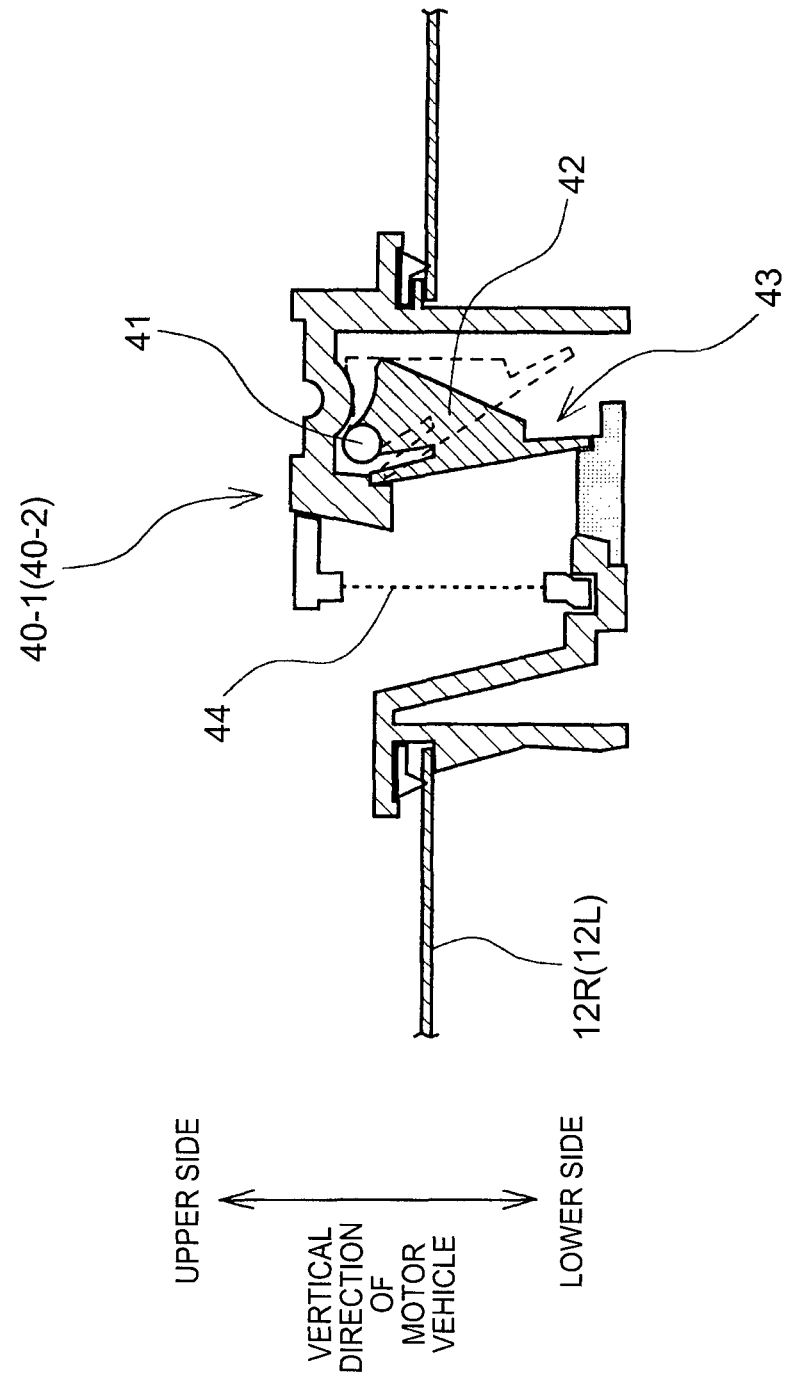
FIG. 4 is a view showing a configurational example of a drain plug.

The floor recessed portions 12R and 12L are equipped with drain plugs 40-1 and 40-2 respectively. FIG. 4 shows a configurational example of the drain plugs 40-1 and 40-2. In the example of FIG. 4, when no liquid such as water or the like is accumulated in the drain plug, a flap 42 is closed due to a reaction force of a spring 41, so a drain port 43 is closed. On the other hand, when a predetermined amount of a liquid such as water or the like is accumulated in the drain plug 40 after having passed through a mesh (a filter) 44 that is provided at a drain plug inlet, the flap 42 opens due to a pressure of the liquid (in a state indicated by a broken line of FIG. 4). The flap 42 opens, and the drain port 43 opens, so the liquid accumulated in the drain plug is discharged to the outside of the vehicle interior through the drain port 43. It should be noted, however, that various configurations other than the configurational example of FIG. 4 can be applied to the drain plugs 40-1 and 40-2. For example, the drain plugs 40-1 and 40-2 may have the function of a check valve that allows liquid to flow from the vehicle interior to the outside thereof and blocks the flow of liquid from the outside of the vehicle interior thereinto.

A battery pack 24 is mounted on the waterproof tray 22-1. The battery pack 24 is configured to include a battery body 24-1 and an electronic component 24-2. The battery body 24-1 and the electronic component 24-2 are linked with each other via a wire harness, thus constituting a circuit. A flange plate 27 is provided on an upper face of a case of the battery pack 24 (the battery body 24-1 and the electronic component 24-2). The flange plate 27, the waterproof tray 22-1, and the cross members 16-1 to 16-3 are fastened by bolts 29-1 to 29-3 respectively. In this manner, the waterproof tray 22-1 is fixed to a vehicle body, and the battery pack 24 (the battery body 24-1 and the electronic component 24-2) is fixed to the vehicle body while floating above a bottom face of the waterproof tray 22-1. The waterproof tray 22-1 is preferably installed with a narrow gap from the floor recessed portion 12R. In the example of FIG. 1, the drain plug 40-1 is arranged below the waterproof tray 22-1.

A battery pack cooling device 26 as a battery pack-associated component is mounted on the waterproof tray 22-2. The battery pack cooling device 26 is configured to include a cooling blower 26-1 and ducts 26-2 and 26-3. By supplying cooling wind to the battery pack 24, the battery pack 24 is cooled. The battery pack cooling device 26 (the cooling blower 26-1 and the ducts 26-2 and 26-3) is fixed, in a suspended state, to a lower face of a protection panel 28. The protection panel 28 and the waterproof tray 22-2 are fastened to the cross members 16-2 and 16-3 by bolts 29-4 and 29-5 respectively. In this manner, the waterproof tray 22-2 is fixed to the vehicle body, and the battery pack cooling device 26 is fixed to the vehicle body while floating above a bottom face of the waterproof tray 22-2. The waterproof tray 22-2 is installed such that a space 19 is formed between the floor recessed portion 12L and the floor tunnel portion 12T. In the example of FIG. 1, the drain plug 40-2 is arranged below the space 19.

A wire harness 26-4 for operating the battery pack cooling device 26 (the cooling blower 26-1) is electrically connected to a subsidiary wire harness 52 by a non-waterproof connector 51. The subsidiary wire harness 52 is electrically connected to a main wire harness 54 by a waterproof connector 53. The main wire harness 54 is electrically connected to a battery (not shown). The non-waterproof connector 51 is arranged in the waterproof tray 22-2 (e.g., at a bottom portion of the waterproof tray 22-2), and the waterproof connector 53 is arranged outside the waterproof tray 22-2 (at an upper portion of the waterproof tray 22-2). Incidentally, a component other than the battery pack cooling device 26, for example, a battery pack charge/discharge circuit or the like can also be mounted on the waterproof tray 22-2, as the battery pack-associated component.

A floor carpet 30 is laid on the battery pack 24 and the protection panel 28 in such a manner as to cover them. The case of the battery pack 24 (the battery body 24-1 and the electronic component 24-2) and the protection panel 28 have sufficient rigidity for a load from the vehicle interior, and serves also to receive the load from the vehicle interior. The waterproof trays 22-1 and 22-2 are not located directly below a notch and a hole of the floor carpet 30 and matching portions for interior parts.

In the present embodiment of the invention, a flange plate 32-1 that projects toward the waterproof tray 22-2 side (toward the left side of the motor vehicle) is provided on a peripheral edge (a peripheral edge on the left side of the motor vehicle) of the waterproof tray 22-1. A flange plate 32-2 that projects toward the waterproof tray 22-1 side (toward the right side of the motor vehicle) is provided on a peripheral edge (a peripheral edge on the right side of the motor vehicle) of the waterproof tray 22-2. Then, with the flange plate 32-2 located above the flange plate 31-1 with respect to the motor vehicle, the flange plate 32-1 and the flange plate 32-2 overlap with each other. In the example of FIG. 1, the flange plate 32-1 and the flange plate 32-2 overlap with each other on the floor tunnel portion 12T. Furthermore, a protrusion portion 34 that protrudes froth the flange plate 32-2 upward with respect to the motor vehicle is provided on the peripheral edge (the peripheral edge on the left side of the motor vehicle) of the waterproof tray 22-1, in such a manner as to face the flange plate 32-2. In the example of FIG. 1, the protrusion portion 34 is arranged on the floor tunnel portion 12T.

For example, when a large amount of a liquid such as water or the like is spilt in the vehicle interior, when the snow and ice and the like brought into the vehicle interior melt, or when rain water has entered the vehicle interior due to a failure in a weather strip of a door or the like, the liquid such as water or the like enters a space above the floor panel 12 (the floor recessed portion 12R and the floor recessed portion 12L). When a liquid such as water or the like is accumulated in the floor recessed portion 12R and the floor recessed portion 12L and water is poured onto the battery pack 24 and the battery pack cooling device 26 that are mounted thereon, a functional failure may be caused.

Figure 5:
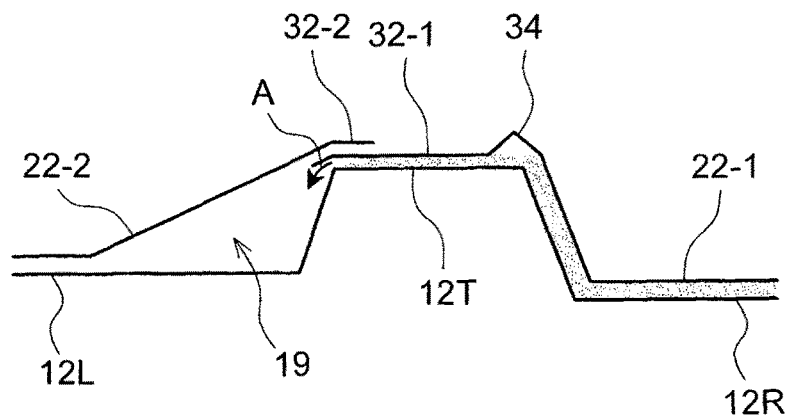
FIG. 5 is a view illustrating the flow of a liquid that has entered a space between a floor recessed portion 12R and a waterproof tray 22-1.

In contrast, according to the present embodiment of the invention, the waterproof trays 22-1 and 22-2 can protect the battery pack 24 and the battery pack cooling device 26 from a liquid such as water or the like that has entered the floor recessed portions 12L and 12R, and the liquid that is accumulated in gaps between the floor recessed portions 12L and 12R and the waterproof trays 22-1 and 22-2 can be discharged to the outside of the vehicle interior by the drain plugs 40-1 and 40-2. Furthermore, even in the case where a liquid such as water or the like is accumulated in the floor recessed portion 12R at a speed higher than the drain speed of the drain plug 40-1 or the drain plug 40-1 undergoes a functional failure (is closed), when a predetermined amount or more of the liquid is, accumulated in a gap between the floor recessed portion 12R and the waterproof tray 22-1, the liquid flows across the floor tunnel portion 12T and then out to the space 19 between the floor recessed portion 12L and the waterproof tray 22-2, as indicated by an arrow A of FIG. 5. In that case, since the flange plate 32-2 is located above the flange plate 31-1 with respect to the motor vehicle, the liquid is prevented from flowing into the waterproof tray 22-1, and water is prevented from being poured onto the battery pack 24 above the waterproof tray 22-1.

Figure 6:
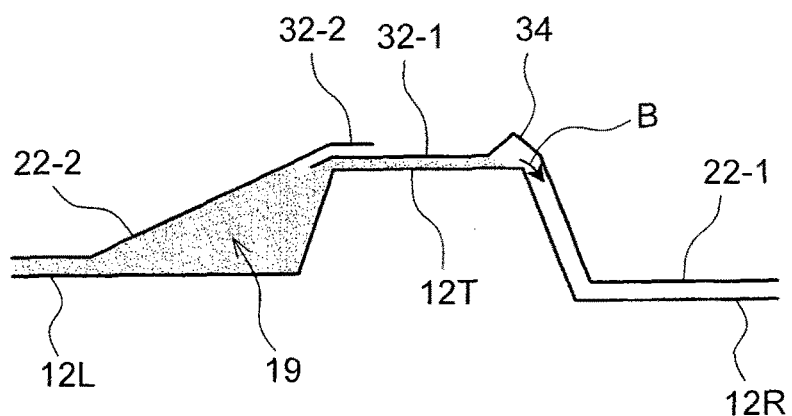
FIG. 6 is a view illustrating the flow of a liquid that has entered a space between a floor recessed portion 12L and a waterproof tray 22-2.
Figure 7:
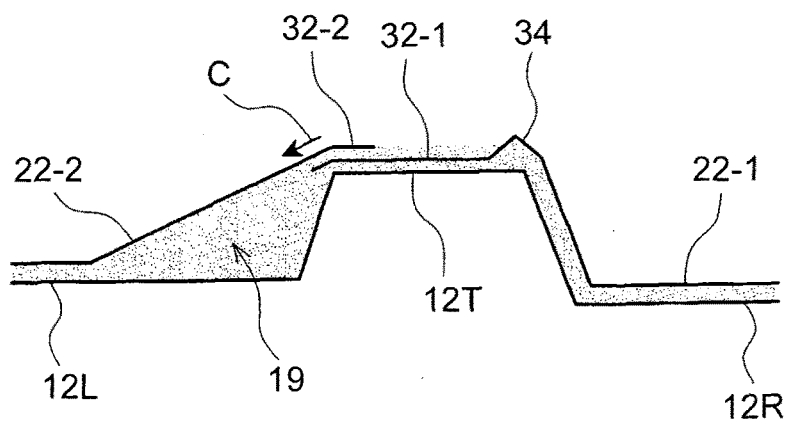
FIG. 7 is a view illustrating the flow of the liquid that has entered the space between the floor recessed portion 12L and the waterproof tray 22-2.

Besides, even in the case where a liquid such as water or the like is accumulated in the floor recessed portion 12L at a speed higher than the drain speed of the drain plug 40-2 or the drain plug 40-2 undergoes a functional failure (is closed), when the amount of the liquid stored in the space 19 between the floor recessed portion 12L and the waterproof tray 22-2 reaches a limit, the liquid flows across the floor tunnel portion 12T and then out to the gap between the floor recessed portion 12R and the waterproof tray 22-1, as indicated by an arrow B of FIG. 6. Furthermore, even when the amount of the liquid flowing out increases and the amount of the liquid stored in the gap between the floor recessed portion 12R and the waterproof tray 22-1 reaches a limit, the protrusion portion 34 that is provided on the peripheral edge of the waterproof tray 22-1 prevents the liquid from flowing into the waterproof tray 22-1, so the liquid flows into the waterproof tray 22-2 as indicated by an arrow C of FIG. 7. Thus, water is prevented from being poured onto the battery pack 24 on the waterproof tray 22-1.

When a liquid such as water or the like flows into the waterproof tray 22-2, water is poured onto the non-waterproof connector 51 that is installed on the bottom portion of the waterproof tray 22-2. In that case, the battery pack cooling device 26 (the cooling blower 26-1) outputs a signal (a diagnosis) indicating an operational failure. Thus, it is possible to detect that a large amount of the liquid has entered the waterproof tray 22-2 before the entrance of the liquid into the waterproof tray 22-1.

As described above, according to the present embodiment of the invention, even when a liquid such as water or the like has entered the floor recessed portion 12R and the floor recessed portion 12L, the battery pack 24 and the battery pack cooling device 26 can be protected from the liquid by the waterproof trays 22-1 and 22-2 respectively. Furthermore, there is provided a structure in which the liquid does not flow into the waterproof tray 22-1 even when the liquid is accumulated in the floor recessed portion 12R and the floor recessed portion 12L. Therefore, a functional failure can be prevented from being caused due to the pouring of water on the battery pack 24 that, is mounted on the waterproof tray 22-1. Furthermore, even when the liquid is accumulated and has flowed into the waterproof tray 22-2, the battery pack cooling device 26 outputs a signal indicating an operational failure due to the pouring of water on the non-waterproof connector 51. Thus, it is possible to detect that a large amount of the liquid has entered the waterproof tray 22-2 before the pouring of water on the expensive battery pack 24. As a result, a functional failure can be prevented from being caused due to the pouring of water on the battery pack 24.

In the foregoing description, the example in which the floor panel 12 (the floor recessed portions 12L and 12R) is equipped with the drain plugs 40-1 and 40-2 has been described. However, even in the case where the drain plugs 40-1 and 40-2 are not installed, a functional failure, can be prevented from being caused due to the pouring of water on the battery pack 24 that is mounted on the waterproof tray 22-1.

In the foregoing description, the example in which the waterproof trays 22-1 and 22-2 are arranged across the floor tunnel portion 12T in the lateral direction of the motor vehicle has been described. However, the waterproof trays 22-1 and 22-2 can also be arranged across a cross member in the longitudinal direction of the motor vehicle. For example, in the case where the waterproof tray 22-1 is arranged behind the waterproof tray 22-2 with respect to the motor vehicle, it is also possible to provide the flange plate 32-1 on the peripheral edge of the waterproof tray 22-1 on the front side of the motor vehicle, provide the flange plate 32-2 on the peripheral edge of the waterproof tray 22-2 on the rear side of the motor vehicle, and overlap the flange plate 32-1 and the flange plate 32-2 with each other on the cross member such that the flange plate 32-2 is located above the flange plate 31-1 with respect to the motor vehicle.

Although the mode of carrying out, the invention has been described above, it is obvious that the invention should not be limited at all to this embodiment thereof and can be carried out in various modes within a scope that does not depart from the gist thereof.

The invention claimed is:

1. A motor vehicle apparatus comprising:
   a floor panel;
   a battery pack;
   a battery pack-associated component;
   a first tray on which the battery pack is arranged, the first tray being arranged on the floor panel;
   a first flange portion that is provided on a first peripheral edge, the first peripheral edge being a peripheral edge of the first tray;
   a second tray on which the battery pack-associated component is arranged, the second tray being arranged on the floor panel; and
   a second flange portion that is provided on a second peripheral edge, the second peripheral edge being a peripheral edge of the second tray, wherein the second flange portion is located above the first flange portion in a vertical direction of the motor vehicle, the second flange portion overlaps with the first flange portion in the vertical direction of the motor vehicle, the first flange portion projects toward the second tray, and the second flange portion projects toward the first tray, wherein the floor panel includes a floor tunnel portion, and the first flange portion and the second flange portion overlap with each other on the floor tunnel portion.

2. The motor vehicle apparatus according to claim 1, wherein the floor panel includes a first recessed portion, a second recessed portion, and a remaining portion—in a lateral direction of the motor vehicle, the first recessed portion and the second recessed portion being regions that are sunken downward in the vertical direction of the motor vehicle with respect to the remaining portion of the floor panel, the floor tunnel portion is located between the first recessed portion and the second recessed portion, and is a region that protrudes upward in the vertical direction of the motor vehicle with respect to the first recessed portion and the second recessed portion.

3. The motor vehicle apparatus according to claim 2, wherein the first tray is arranged on the first recessed portion, the second tray is arranged on the second recessed portion, and the first flange portion and the second flange portion overlap with each other above the floor tunnel portion.

4. A motor vehicle apparatus comprising:
a floor panel;
a battery pack;
a battery pack-associated component;
a first tray on which the battery pack is arranged, the first tray being arranged on the floor panel;
a first flange portion that is provided on a first peripheral edge, the first peripheral edge being a peripheral edge of the first tray;
a second tray on which the battery pack-associated component is arranged, the second tray being arranged on the floor panel; and
a second flange portion that is provided on a second peripheral edge, the second peripheral edge being a peripheral edge of the second tray, wherein the second flange portion is located above the first flange portion in a vertical direction of the motor vehicle, the second flange portion overlaps with the first flange portion in the vertical direction of the motor vehicle, the first flange portion projects toward the second tray, and the second flange portion projects toward the first tray, wherein a protrusion portion is provided on the first peripheral edge, and the protrusion portion protrudes above the second flange portion, and faces the second flange portion, wherein the first flange portion, the second flange portion, and a floor tunnel portion of the floor panel, are arranged spaced apart from one another in the vertical direction of the motor vehicle.

5. The motor vehicle apparatus according to claim 1, wherein a connector is connected to the battery pack-associated component, the connector being a non-waterproof connector.

6. The motor vehicle apparatus according to claim 1, wherein the battery pack-associated component is a battery pack cooling device, the battery pack cooling device including a cooling blower and a duct, and the battery pack cooling device cooling the battery pack by supplying cooling wind to the battery pack.

* * * * *